Aug. 31, 1948.    C. V. McCLINTOCK    2,448,271
VITRIFIED CLAY PIPE JOINT
Filed July 21, 1945
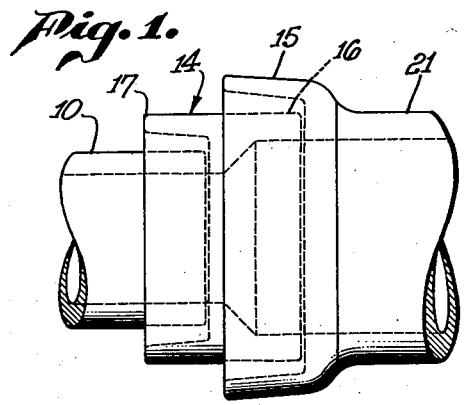
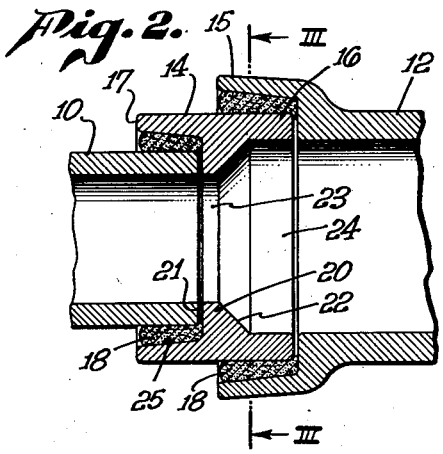
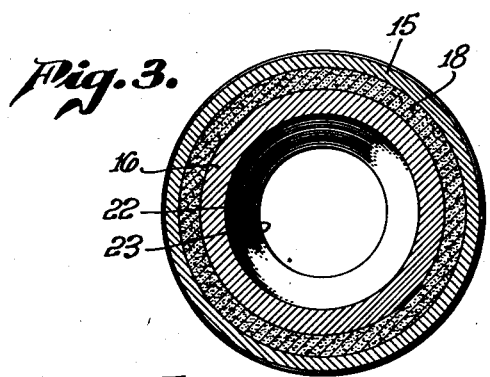
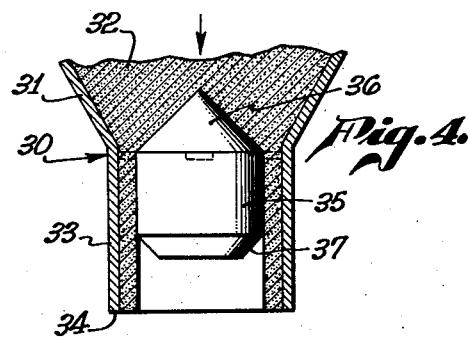
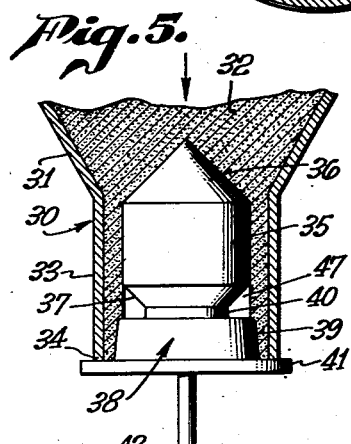
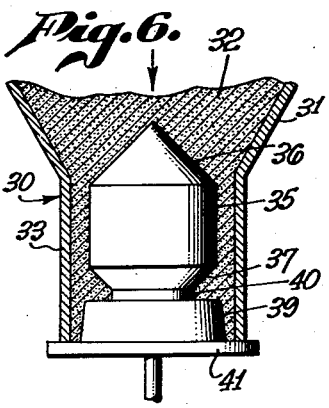
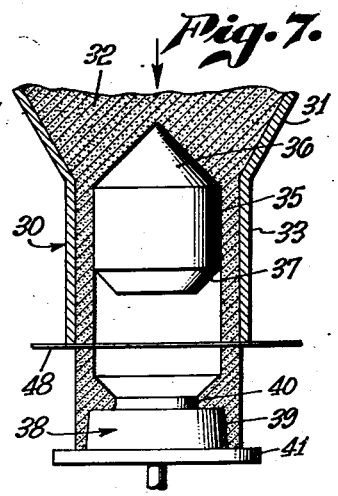
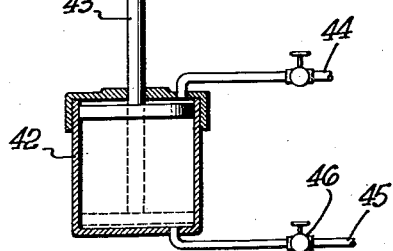
INVENTOR.
Cecil V. McClintock,
BY
ATTORNEY Patented Aug. 31, 1948

2,448,271

UNITED STATES PATENT OFFICE 2,448,271

VITRIFIED CLAY PIPE JOINT

Cecil V. McClintock, Whittier, Calif., assignor to Pacific Clay Products, Los Angeles, Calif., a corporation of California Application July 21, 1945, Serial No. 606,387

5 Claims. (Cl. 285—183)

My invention relates to ceramic or clay composition products and particularly articles in the form of pipe connections and a method of producing them.

The production of burned clay products is an old art and widely practiced. As a result, the art has long recognized two particular means of forming a shape from clay composition and subsequently burning it at a suitable temperature to mature the clay. The oldest known method of forming the clay has been to pressure mold it to shape. This method is limited to the molding of symmetrical objects and cannot be used where the object has a transverse fin, shoulder or lip intermediate its ends.

Another commonly used method of making shapes from clay material is the extrusion method. By this means the clay material is pressed through an orifice die which imparts outside shape or form to the product being made and which may be provided with a core so that hollow objects can be extruded.

With both of these methods certain limitations are encountered and it has been found relatively expensive to mold clay shapes having interior projections intermediate the ends.

With this in view, it is among the objects of my invention to provide a new and improved vitrified clay product and method of forming the same by means of which an inwardly extending projection may be incorporated in a pipe-like form without it being necessary to provide a core of intricate shape.

Another object of my invention is to provide a new and improved vitrified clay object and method of forming the same which is rapid and economical and in which relatively few of the molded objects are broken prior to being placed in a kiln for baking.

Still another object of my invention is to provide a new and improved vitrified clay product having an inwardly extending flange intermediate the ends wherein the flange and the wall of the object are homogeneous and of uniform density and in which the customary draft may be eliminated at the interior of the object between the flange and one end.

A still further object of my invention is to provide a new and improved method of forming vitrified clay pipe joints having an interior protrusion intermediate the ends wherein a molding step is combined with an extrusion step in such a manner that the production of molds by these combined steps is virtually continuous.

It will be apparent from the accompanying drawings and the following description that while many of the elements of structure and method are familiar to the art of making clay products, old elements and new have been marshaled together to produce a new and novel ceramic product incorporating novel steps in the formation of the article prior to baking or burning entirely distinct from anything heretofore produced, easy to fabricate and operate, more efficient than previous methods and having a usefulness which will continue indefinitely.

In the drawings:

Fig. 1 is a side elevational view of a pipe joint incorporating the novel connection.

Fig. 2 is a longitudinal sectional view of the pipe joint shown in Fig. 1.

Fig. 3 is a cross section taken on the line III—III of Fig. 2.

Figs. 4, 5, 6, and 7 are diagrammatic illustrations of the various steps in the process of forming the article prior to baking or burning.

It will, of course, be appreciated by those skilled in the art that the use of extrusion processes with and without cores and the use of cores and molds in forming plastic material into shapes for baking are well established and well known. It will also be appreciated, in view of the universally accepted methods having been proven and in use for a great length of time, that innovations or even slight changes from accepted practice seldom find their way into the art. As in so many arts where material is cheap, the time element required in the production of the parts prior to molding has heretofore not been considered as of great importance. The breakage of molded forms has likewise been considered of secondary character in view of the readiness and ease with which they have been made.

There are, however, some forms in which the breakage may be high and it has also been found that time saved in the making of forms where little or no breakage is encountered has a material effect upon the economy of manufacturing operations over a period of time. Moreover, with the increasing cost of labor, material and production methods, a vitrified clay pipe joint which can be more inexpensively manufactured than heretofore and which can be made also of an improved design is highly desirable.

In the embodiment chosen to illustrate my invention there is shown a pipe joint in which the novel element has been incorporated. Figs. 1, 2, and 3 show a ceramic pipe 10 connected to a clay pipe 12 of substantially larger diameter. The change is effected by means of a pipe joint or fitting 14 frequently termed an increaser. It will be noted that the large pipe section has a bell end 15 in which one end 16 of the increaser is inserted and that the opposite end 17 of the increaser has the nature of a bell end into which the smaller pipe is inserted. A suitable packing 18 is provided in each case. The increaser itself has a uniform cylindrical outside diameter slightly larger than the outside diameter of the small pipe and approximately the same or slightly smaller diameter than the outside diameter of the large pipe 12. The particular embodiment shows a cylindrical pipe but it will be appreciated that pipes of other shape are also contemplated.

On the interior of the increaser is provided an annular projection 20, one side 21 of which is flat and transverse to the axis of the joint and the other side 22 of which is provided with a slope of approximately 45° in the form illustrated. Intermediate the sides 21 and 22 there is a cylindrical connecting portion 23 having a diameter approximately the same as the inside diameter of the small pipe 10.

The inside wall 24 of the increaser on the side thereof adjacent the sloping side of the projection is cylindrical in shape, that is to say without draft, and has a diameter substantially the same as that of the inside of the large pipe.

The interior of the increaser on the side adjacent the flat face 21 of the projection has an outward flare 25. All parts of the flared interior are substantially greater in diameter than the outside diameter of the small pipe in order to provide for the packing 18.

In forming the article, a combination of an extrusion and a molding process is used as illustrated in Figs. 4, 5, 6, and 7. An extrusion machine 30 of any suitable type has a body portion 31 from which a clay composition 32 is normally forced through a die 33 providing on its interior a part 34 which is cylindrical in cross section. Within the port is a stationary core 35 of the usual sort which may be held in place by means of a spider. The core has the customary conical end 36 in order to divide the clay material as it enters the port and in this embodiment has an undercut outside end 37.

Adapted to cooperate with the extrusion die is a form 38 which has a frusto-conical base 39 and a cylindrical upper element 40, the diameter of the cylindrical element being smaller than the small end of the frusto-conical base. The form is carried by a platen 41 of a somewhat larger diameter than the lower end of the die. In this embodiment the form and platen are adapted to be moved vertically into place by means of a hydraulic cylinder 42 or other controllable means. In the schematic representation, the platen is moved by piston rod 43 leading to a piston within the cylinder. A hydraulic line 44 is adapted to provide hydraulic fluid on one side of the cylinder for a quick removal of the platen, should that be desired. A hydraulic line 45 provided with a needle valve 46 is adapted to supply hydraulic fluid to the cylinder for lifting the platen and form into place and for subsequently permitting the hydraulic liquid to leave the cylinder at a measured rate when the platen and form are lowered.

In operation, clay composition of suitable type is pressed (as by an auger, large piston or the like) in order to extrude it outwardly through the annular space between the wall of the die port and the wall of the stationary core. Normally this will result in a hollow cylindrical section.

After the clay has reached the outside end of the port and has been cut off even by some convenient means such as a suitable wire, the form is raised to a position shown in Fig. 5. When in the position there shown, the platen is pressed snugly against the outside end of the die. In this position also, the upper face of the cylindrical upper element 40 of the form is pressed snugly against the flat lower face of the stationary core. With the form in this position, there is provided an annular space 47 which extends inwardly from the wall of the extrusion port. Initially the space is empty but pressure is exerted upon the clay material and it is forced laterally inwardly into the annular space, since the platen and form at this stage are held in place with sufficient firmness so that the line of least resistance for the clay material is into the annular space. This is the relationship of the parts and the clay material shown in Fig. 6. After the annular space becomes filled with clay material, the hydraulic pressure is released and continued pressure upon the supply of clay material again forces it gradually outwardly to the position shown in Fig. 7. When the platen 41 has been lowered to the desired point, a wire 48 may be passed over the outside end of the die in order to cut off the formed object at a proper length.

It will be appreciated that any great amount of resistance offered by the platen 41 to the pressure used for extruding the clay material would result in a bowing or distortion in the wall of the molded clay. To avoid this, the platen is permitted to lower at a rate just slightly less than or substantially equal to the rate of extrusion of clay material from the die. By this means there is provided a slight resistance so that the formed material will remain compact without distorting until the wire cut-off separates the extruded portion from that remaining in the die. The lowering of the platen may be readily accomplished by a suitable adjustment of the needle valve 46 which will permit the hydraulic fluid to exhaust from the lower side of the hydraulic cylinder at a suitable predetermined rate. After the cut-off, if desired, the hydraulic cylinder may lower the platen at a more rapid rate by the introduction of pressure into the top side through the hydraulic line 44. After the wire cut-off has been effected, the molded part can be lifted from the platen and mold, dried and burned. The fitting may be glazed if desired. It will be apparent that the portion of the mold which has been formed by extrusion only will have a cylindrical interior, whereas the portion formed by the mold, except for a very short cylindrical section, will have a bell-shaped draw.

There has therefore been provided a molded article to be formed into a vitreous clay part in which simplicity of design has been retained while at the same time providing an interior shape and dimensions of a particular sort and a method for forming the same which incorporates two methods of forming previously practiced in a manner which is adapted to quickly and efficiently form the part to its desired shape.

I claim:

1. A clay pipe form having for its ultimate purpose the joining of a pipe of large size with a pipe of smaller size comprising: an open ended section having a partitioned interior wall, a partition therefor intermediate the ends of the section, said partition being in the form of an annular, inwardly extending projection having one side thereof flat and transverse to the axis and the opposite side extending angularly outwardly toward the adjacent end, the interior wall section on the angularly sloped side of the projection being parallel to the axis and the interior wall section on the opposite side of the projection having an outward flare.

2. A clay pipe form having for its ultimate purpose the joining of a pipe of large size with a pipe of smaller size comprising: a section having an exterior wall and an interior wall, a projection extending throughout the circumference of the interior wall intermediate the ends dividing said interior wall into two sections, said projection having one side thereof flat and transverse to the axis, an opposite side extending angularly outwardly toward the adjacent end and an inner wall parallel with the axis separating said sides, the interior wall section on the angularly sloped side of the projection being parallel to the axis and the interior wall section on the opposite side of the projection having an outward flare.

3. A vitrified clay pipe element adapted for joining a pipe of large diameter with a pipe of smaller diameter comprising an annular section having a cylindrical exterior wall and an interior wall, an inwardly extending annular projection integral with and having the same density and porosity as the remainder of said element and located intermediate the ends of the element to divide said interior wall into two sections, said projection having one side thereof flat and transverse to the axis, an opposite side extending angularly outwardly toward the adjacent end and an inner cylindrical wall separating said sides, the interior wall section on the angularly sloped side of the projection having a cylindrical shape and the interior wall section on the opposite side of the projection having an outward flare, the flat side of said annular projection being adapted to abut the plain end of a pipe while the outward flaring interior wall section of the element cooperates with such plain end pipe to form a pocket for the reception of sealing composition.

4. An open ended, integral extruded clay composition fitting for bell end pipe having a cylindrical outer surface of uniform diameter, an inwardly tapering inner surface contiguous to one end of the fitting, an inwardly extending boss in the fitting, said boss forming an annular shoulder extending in a transverse plane from the tapering surface, said boss having an internal diameter not less than the internal diameter of pipe to be seated against said shoulder, the other end of the fitting having an internal diameter virtually equal to the internal diameter of a larger pipe whose bell is to receive said other end, and a conical, inclined, internal surface between the bore of said boss and said other end of the fitting.

5. A fitting for coupling a bell-ended pipe with a pipe of smaller diameter, the said fitting including a tubular member having a cylindrical outer surface of uniform diameter, one end of said fitting being adapted to be inserted into the bell end of a larger diameter pipe and the other end of the said fitting being adapted to receive the end of a smaller diameter pipe, the said fitting having an internal, inwardly extending projection intermediate the ends thereof, the said projection having a flat side forming a shoulder for abutment with the end of the smaller pipe, the opposite side of said projection being beveled and forming a frusto-conical shaped chamber within said fitting, the interior of the said fitting adjacent the pipe of larger diameter being cylindrical in shape and of substantially the same diameter as the inner diameter of the larger pipe, and sealing means interposed between the outer surface and inner surface of the fitting adjacent the ends of the larger pipe and smaller pipe, respectively.

CECIL V. McCLINTOCK.

REFERENCES CITED

The following references are of record in the file of this patent:

UNITED STATES PATENTS

| Number | Name | Date |
| --- | --- | --- |
| 706,298 | Carlson | Aug. 5, 1902 |
| 715,423 | Ryan | Dec. 9, 1902 |
| 764,347 | Carlson | July 5, 1904 |
| 766,754 | Carlson | Aug. 2, 1904 |
| 1,875,738 | Jones | Sept. 6, 1932 |

FOREIGN PATENTS

| Number | Country | Date |
| --- | --- | --- |
| 13,354 | Great Britain | Aug. 24, 1895 |